(12) United States Patent
Zeng et al.

(10) Patent No.: US 11,290,313 B2
(45) Date of Patent: *Mar. 29, 2022

(54) SYNCHRONIZATION SIGNAL BLOCK INDEX SIGNALING

(71) Applicant: Apple Inc., Cupertino, CA (US)

(72) Inventors: Wei Zeng, San Diego, CA (US); Yuchul Kim, Santa Clara, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 16/806,149

(22) Filed: Mar. 2, 2020

(65) Prior Publication Data

US 2020/0204424 A1 Jun. 25, 2020

Related U.S. Application Data

(63) Continuation of application No. 15/964,156, filed on Apr. 27, 2018, now Pat. No. 10,666,485.

(Continued)

(51) Int. Cl.
*H04L 27/26* (2006.01)
*H04J 13/00* (2011.01)
(Continued)

(52) U.S. Cl.
CPC .......... *H04L 27/2656* (2013.01); *H04J 1/065* (2013.01); *H04J 11/0076* (2013.01);
(Continued)

(58) Field of Classification Search
CPC ............ H04L 27/2656; H04L 25/022; H04W 56/0015; H04J 11/0076; H04J 11/0086; H04J 13/0003; H04J 1/065; H04B 7/0617
See application file for complete search history.

(56) References Cited

U.S. PATENT DOCUMENTS

2014/0247814 A1 9/2014 Zhang et al.
2017/0026922 A1 1/2017 Kim et al.
(Continued)

FOREIGN PATENT DOCUMENTS

CN 102217264 A 10/2011
CN 106416376 A 2/2017
(Continued)

OTHER PUBLICATIONS

International Search Report and Written Opinion, Application No. PCT/US2018/030299, dated Jul. 20, 2018, 13 pages.

(Continued)

*Primary Examiner* — Dady Chery
(74) *Attorney, Agent, or Firm* — Kowert, Hood, Munyon, Rankin & Goetzel, P.C.

(57) ABSTRACT

This disclosure relates to providing synchronization signal block index signaling in a cellular communication system. A cellular base station may provide synchronization signals according to a periodic pattern, including transmitting one or more synchronization signal bursts each including one or more synchronization signal blocks. A wireless device may detect a synchronization signal block. The wireless device may determine a synchronization signal block index of the detected synchronization signal block. The wireless device may provide an indication of the synchronization signal block index of the detected synchronization signal block to the cellular base station.

20 Claims, 9 Drawing Sheets

Related U.S. Application Data

(60) Provisional application No. 62/500,690, filed on May 3, 2017.

(51) Int. Cl.
*H04L 25/02* (2006.01)
*H04J 1/06* (2006.01)
*H04W 56/00* (2009.01)
*H04J 11/00* (2006.01)
*H04B 7/06* (2006.01)

(52) U.S. Cl.
CPC ....... *H04J 11/0086* (2013.01); *H04J 13/0003* (2013.01); *H04L 25/022* (2013.01); *H04W 56/0015* (2013.01); *H04B 7/0617* (2013.01)

(56) References Cited

U.S. PATENT DOCUMENTS

| | | | |
|---|---|---|---|
| 2017/0041894 A1* | 2/2017 | Lee | .............. H04L 5/0073 |
| 2017/0111886 A1 | 4/2017 | Kim et al. | |
| 2017/0353254 A1 | 12/2017 | Islam et al. | |
| 2018/0234931 A1 | 8/2018 | Ly et al. | |
| 2018/0302819 A1* | 10/2018 | Lee | .............. H04B 7/0626 |

FOREIGN PATENT DOCUMENTS

| | | |
|---|---|---|
| WO | 2017/023232 A1 | 2/2017 |
| WO | WO 2017/018966 A1 | 2/2017 |
| WO | WO 2017/023232 | 2/2017 |
| WO | 2017/065548 A1 | 4/2017 |
| WO | WO 2017/065548 | 4/2017 |

OTHER PUBLICATIONS

"Discussion on SS block, SS burst set composition and time index indication"; LG Electronics; 3GPP TSG RAN WG1 #88b, Apr. 3-7, 2017, R1-1704862, 8 pages.

"Design of SS burst set and SS block index"; ZTE et al., 3GPP TSG RAN WG1 #88, Feb. 13-17, 2017, R1-1701573, 5 pages.

"SS BW and multiplexing"; Samsung, 3GPP TSG RAN WG1, Jan. 16-20, 2017, R1-1700884, 8 pages.

"RS for P1 Beam Management"; Samsung, 3GPP TSG RAN WG1 #88bis, Apr. 3-7, 2017, R1-1705362, 4 pages.

"Measurement report content for A1-A6 events"; Ericsson, 3GPP TSG RAN WG2 #97bis, Apr. 3-7, 2017, R2-1702799, 3 pages.

"SS block, burst-set composition, and time index indication" Qualcomm Incorporated, 3GPP TSG RAN WG1 #88bis, Apr. 3-7, 2017, R1-1705565, 9 pages.

"Discussion on SS block composition, SS burst set composition and SS block index indication for NR"; NTT DOCOMO, Inc., 3GPP TSG RAN WG1 #88bis, Apr. 3-7, 2017, R1-1705705, 8 pages.

"On NR-SS structure and time indexing"; ITL, 3GPP TSG RAN WG1 #88bis, Apr. 3-7, 2017, R1-1705792, 5 pages.

"Composition of SS block, burst and burst set" ZTE et al., 3GPP TSG RAN WG1 #88bis, Apr. 3-7, 2017, R1-1704358, 10 pages.

Office Actions for Chinese Application No. 201880029114.5, dated Mar. 30, 2021, 5 pages.

* cited by examiner

SYNCHRONIZATION SIGNAL BLOCK INDEX SIGNALING

PRIORITY INFORMATION

This application is a continuation of U.S. patent application Ser. No. 15/964,156, entitled "Synchronization Signal Block Index Signaling," filed Apr. 27, 2018, which claims priority to U.S. provisional patent application Ser. No. 62/500,690, entitled "Synchronization Signal Block Index Signaling," filed May 3, 2017, all of which are hereby incorporated by reference in its entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, and more particularly to systems, apparatuses, and methods for providing synchronization signal block index signaling in a cellular communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH', etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications.

To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments are presented herein of apparatuses, systems, and methods for providing synchronization signal block index signaling in a cellular communication system.

According to the techniques described herein, synchronization signals may be provided in a cellular communication system according to a predetermined periodic pattern. According to the periodic pattern, each synchronization signal period may be referred to as a synchronization signal burst set, each synchronization signal burst set may include one or more synchronization signal bursts, which may in turn be subdivided into one or more synchronization signal blocks.

A cellular base station providing synchronization signals according to such a predetermined periodic pattern may utilize a multi-level scheme for signaling an index value for each synchronization signal block transmitted by the cellular base station, that may allow for the base station to retain substantial flexibility with respect to selecting which nominal synchronization signal blocks are actually transmitted by the base station, which beamforming arrangement to use to transmit each synchronization signal block, and/or various other transmission parameters.

The scheme may include explicit signaling of the synchronization signal burst in which each synchronization signal block is located, and implicit signaling of the relative position of each synchronization signal block within the synchronization signal burst. Notably, use of an implicit signaling scheme for indicating the relative position of the synchronization signal blocks within a synchronization signal burst may potentially allow wireless devices to perform coherent combining of multiple synchronization signal blocks of a synchronization signal burst, e.g., as it may be possible for the content of the synchronization signal blocks of a synchronization signal burst to be identical when using such a scheme.

A wireless device that detects a synchronization signal block that is provided according to such a scheme may be able to determine the synchronization signal block index of the detected synchronization signal block, e.g., based on the multi-part signaling scheme. The wireless device may be able to determine radio frame level timing and/or other characteristics of a cell provided by the cellular base station based on determining the synchronization signal block index of the detected synchronization signal block.

Additionally or alternatively, the wireless device may provide an indication of the synchronization signal block index of a synchronization signal block detected by the wireless device to the cellular base station. This may assist the cellular base station in determining one or more communication characteristics to use when performing subsequent communication with the wireless device. As one such possibility, the cellular base station might determine a beamforming arrangement to use when communicating with the wireless device based on the synchronization signal block index of the synchronization signal block detected by the wireless device. For example, the cellular base station might use the same beamforming arrangement as it used to transmit the synchronization signal block detected by the wireless device, as the ability of the wireless device to detect that particular synchronization signal block may be an indicator that that beamforming arrangement may provide a relatively good signal strength and/or quality to the wireless device.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
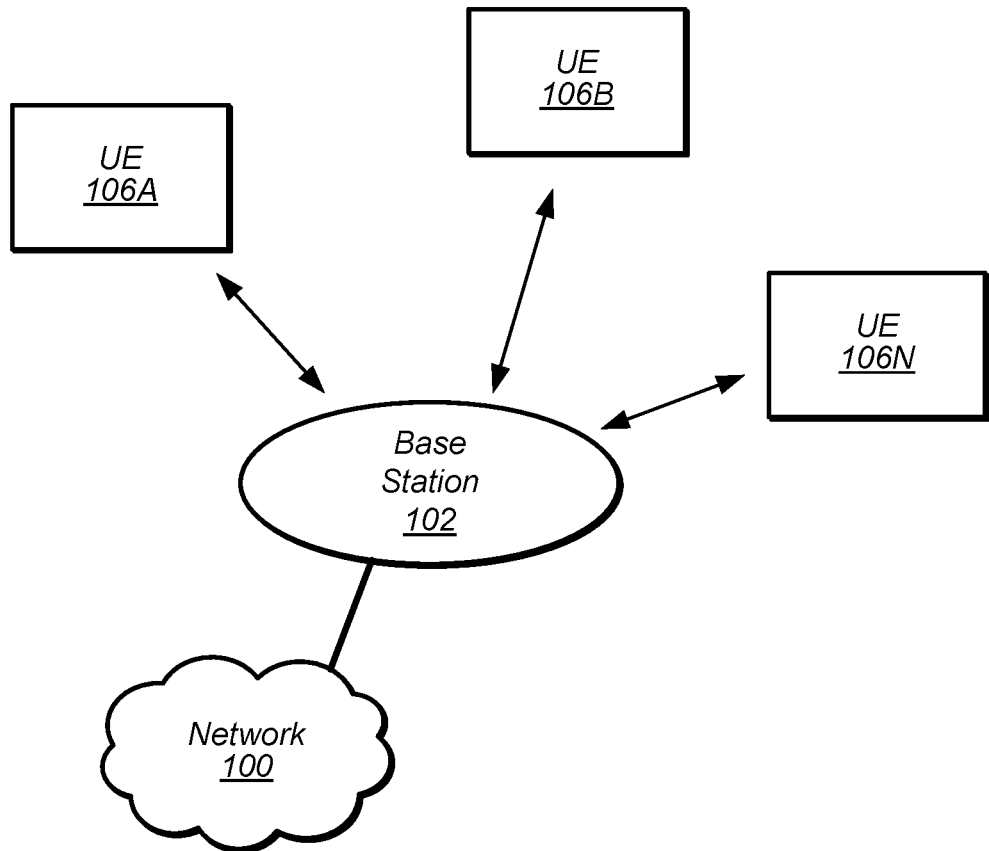
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
LAN: Local Area Network
WLAN: Wireless LAN
AP: Access Point
RAT: Radio Access Technology
IEEE: Institute of Electrical and Electronics Engineers
Wi-Fi: Wireless Local Area Network (WLAN) RAT based on the IEEE 802.11 standards Terms The following is a glossary of terms that may appear in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
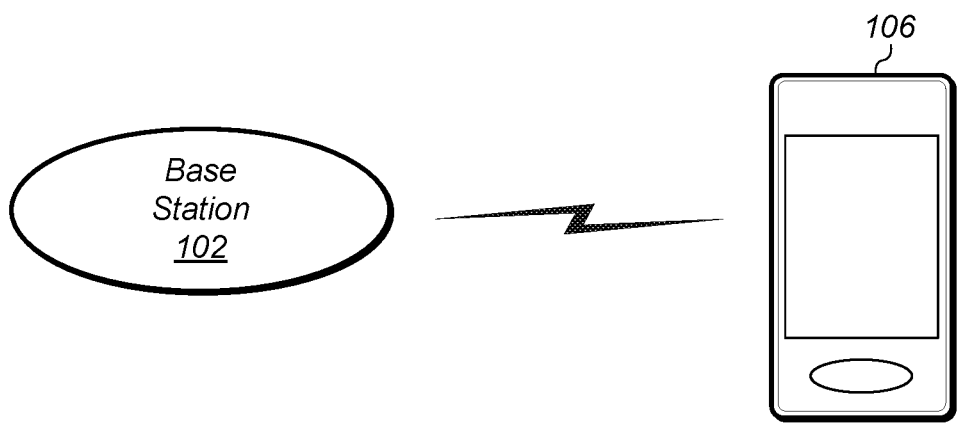
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, WiMAX etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to receive synchronization signals and interpret the sychronization signal block index signaling for the synchronization signals, at least according to the various methods as described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a handheld device, a wearable device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or GSM), and separate radios for communicating using each of Wi-Fi and BLUETOOTH'. Other configurations are also possible.

Figure 3:
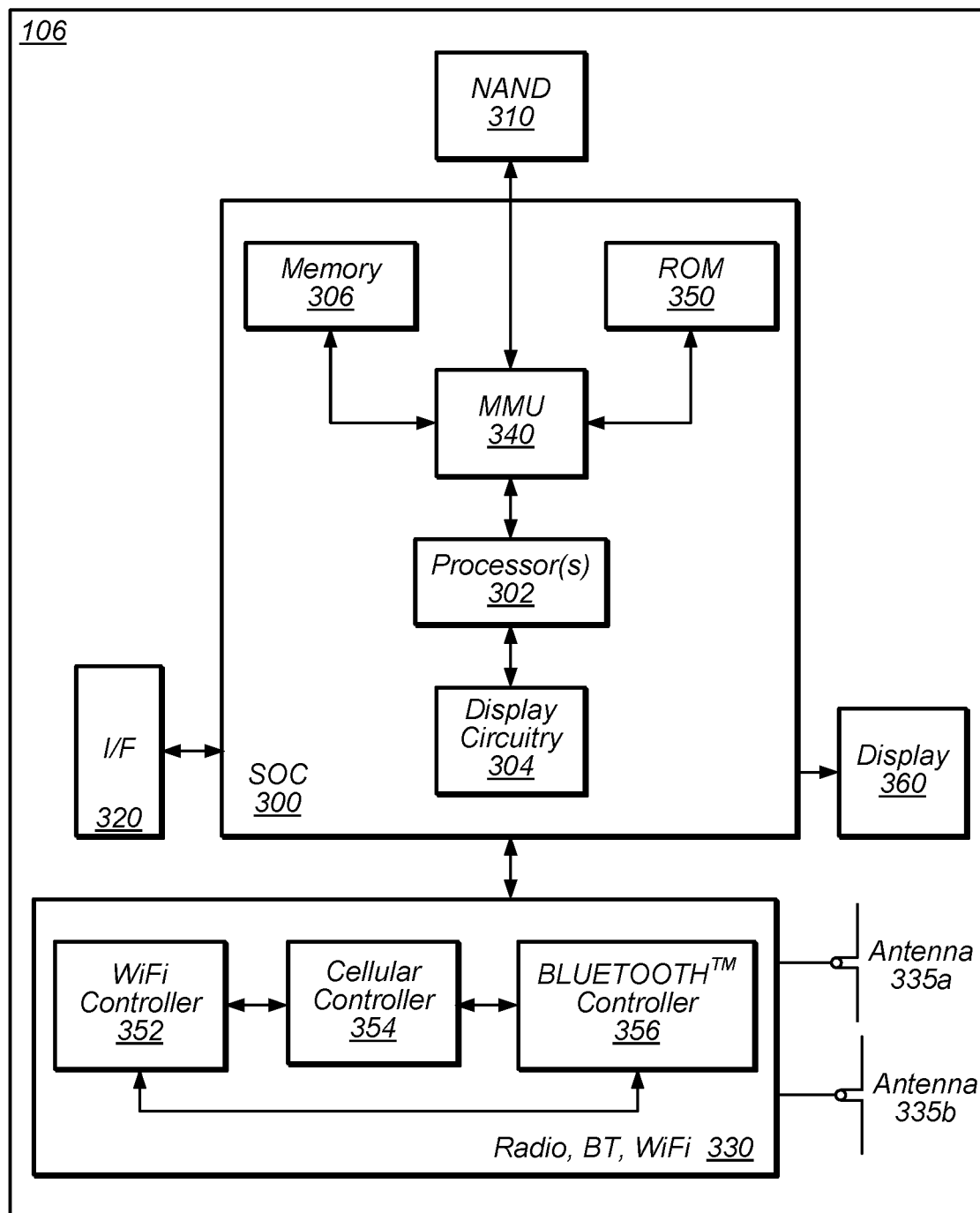
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry 330 (e.g., for LTE, LTE-A, NR, CDMA2000, BLUETOOTH', Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

As described further subsequently herein, the UE 106 may include hardware and software components for implementing methods for the UE 106 to receive synchronization signals and interpret the sychronization signal block index signaling for the synchronization signals. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to receive synchronization signals and interpret the sychronization signal block index signaling for the synchronization signals according to various embodiments disclosed herein. Processor(s) 302 may also implement various other applications and/or end-user applications running on UE 106.

In some embodiments, radio 330 may include separate controllers dedicated to controlling communications for various respective RATs and/or standards. For example, as shown in FIG. 3, radio 330 may include a Wi-Fi controller 352, a cellular controller (e.g. NR controller) 354, and BLUETOOTH' controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH' controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing Wi-Fi preamble detection, e.g., for detecting Wi-Fi physical layer preambles transmitted in unlicensed frequency bands that might be relevant to possible communication in unlicensed spectrum by the UE 106. As another possibility, the cellular controller 354 may include hardware and/or software components for generating Wi-Fi physical layer preamble signals, e.g., for transmitting as part of uplink communications by the UE 106 that occur in unlicensed frequency bands.

Figure 4:
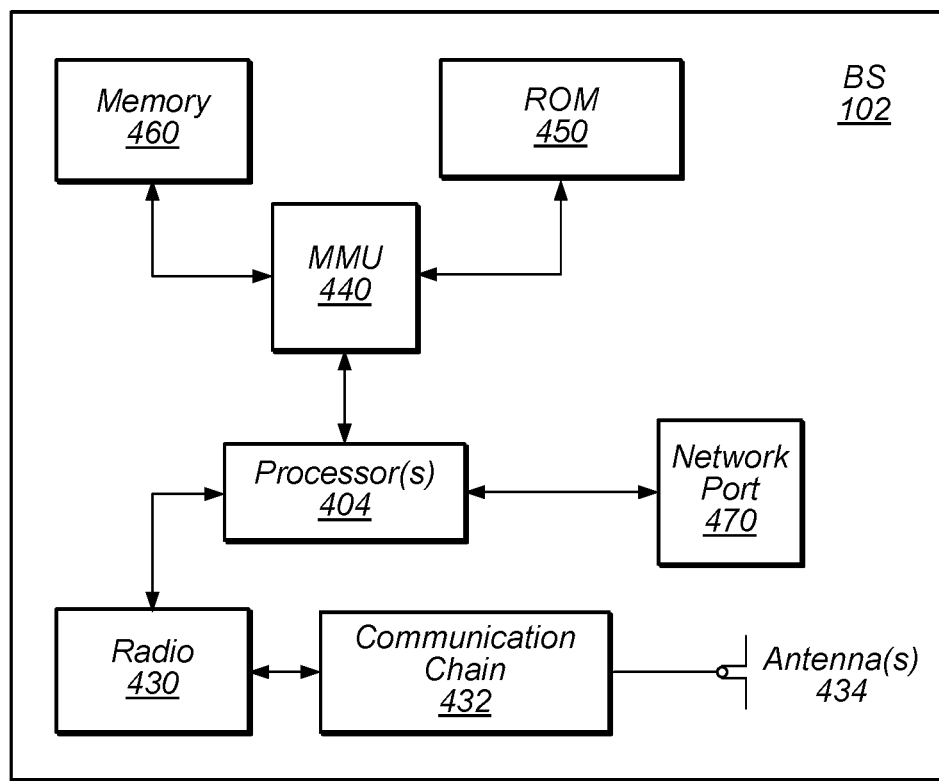
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. The base station 102 may operate according to the various methods as disclosed herein for providing synchronization signal block index signaling.

Figure 5:
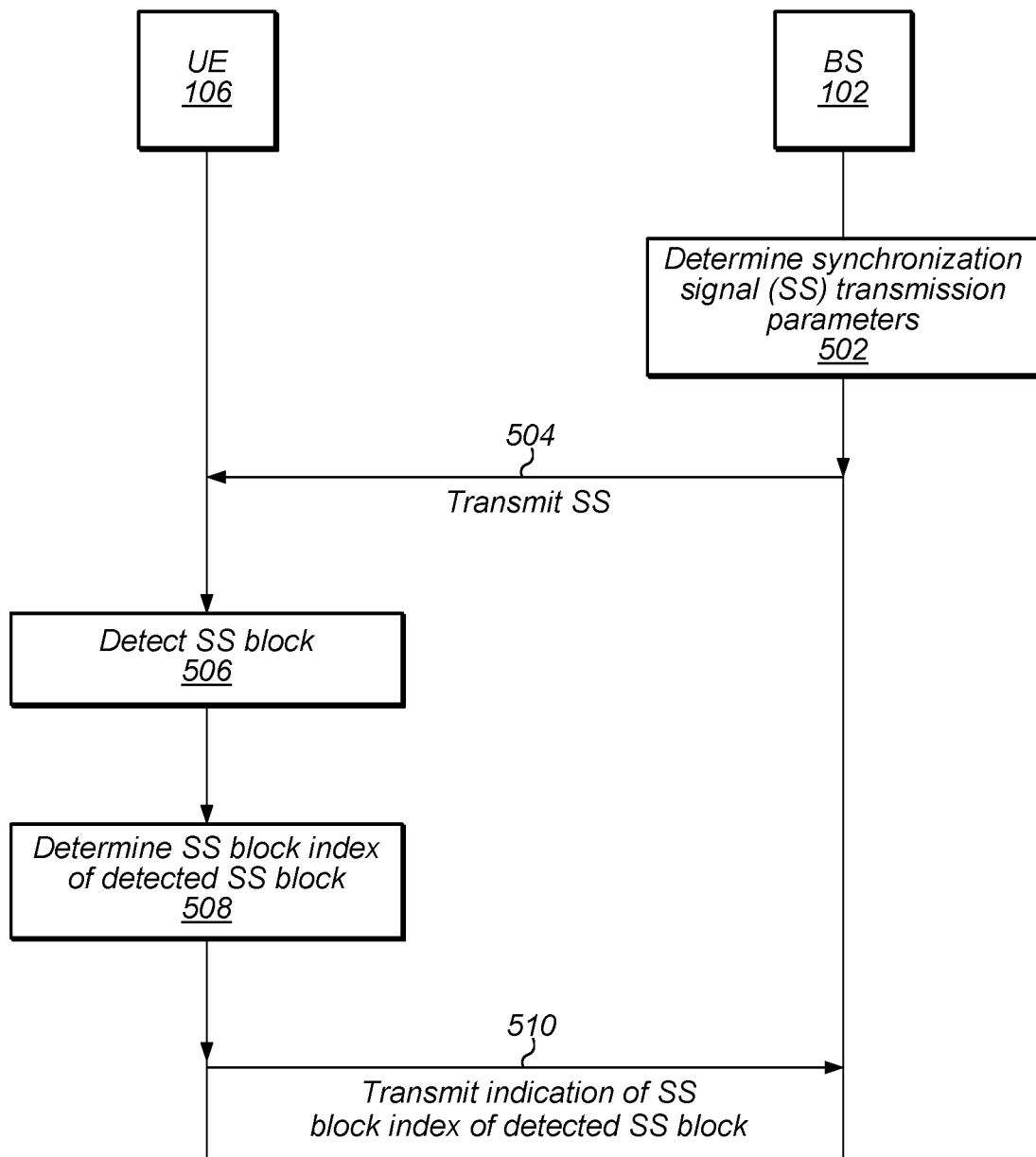
FIG. 5 is a communication flow diagram illustrating aspects of an exemplary possible method for providing synchronization signal block index signaling in a cellular communication system, according to some embodiments.

FIG. 5—Synchronization Signal Block Index Signaling

Synchronization signals may commonly be used in a cellular communication system to assist wireless devices to detect and acquire system information for cells of the cellular communication system. There may be multiple types of synchronization signals, which may include primary synchronization signals (PSS), secondary synchronization signals (SSS), a physical broadcast channel (PBCH), and/or any of various other portions, according to various embodiments. The synchronization signals may provide/facilitate one or more aspects of cell detection/access, such as timing synchronization (e.g., symbol, time slot, subframe, and/or radio frame level timing), physical cell identifier (cell ID), and/or part or all of the system information (e.g., a master information block (MIB), one or more system information blocks (SIBs), etc.) for the cell, among various possibilities.

The synchronization signals may be provided together or at different times, and may be transmitted according to any of various transmission patterns, as desired. As one possibility (e.g., according to 3GPP LTE), the PSS, SSS, and PBCH may be provided at separate periodic intervals. As another possibility (e.g., according to 3GPP NR), the PSS, SSS, and PBCH may be provided together (e.g., using consecutive symbols) in each of multiple synchronization signal blocks that are transmitted according to a desired transmission pattern. According to some embodiments, each periodic pattern of synchronization signals provided by a cell may be referred to as a synchronization signal burst set.

It may be useful, at least in some instances, for a wireless device to determine which synchronization signal block within a synchronization signal burst set has been detected by the wireless device. For example, such information may help the wireless device determine radio frame level timing for the cell. It may also or alternatively be useful for a cellular base station to determine which synchronization signal block within a synchronization signal burst set has been detected by a wireless device that is attaching to its cell. For example, in some instances, the transmission characteristics of different synchronization signal blocks within a synchronization signal burst set may differ such that useful information may be gained by determining which synchronization signal block a wireless device is able to detect.

One such possible transmission characteristic that may differ between different synchronization signal block transmissions may include the beam direction of the synchronization signal blocks. In some embodiments, some or all of the synchronization signal blocks may be transmitted using omnidirectional signals, which may work well for cells deployed in lower frequency ranges (e.g., 2 GHz deployments, in some instances), according to some embodiments. As another possibility, some or all of the synchronization signal blocks may be beamformed. Further, it may be possible that different synchronization signal blocks may be transmitted using different beamforming arrangements. For example, it may be possible to provide sweeping beam signals that provide transmissions targeted to each of various portions of a cell's coverage area over the course of each synchronization burst set. Such an arrangement may be useful for cells deployed in higher frequency ranges (e.g., millimeter wave/60 GHz deployments, in some instances), according to some embodiments.

Thus, if a sweeping beam signal arrangement is used (or synchronization signal blocks are otherwise transmitted using different beam configurations at different times), it may be useful for a cellular base station to be able to identify which synchronization signal block (and thus which beam direction) a wireless device is able to most effectively detect.

Accordingly, it may be useful to provide signaling for synchronization signal blocks such that a wireless device is able to determine (and potentially report back) which synchronization signal block is detected by the wireless device. FIG. 5 is a communication flow diagram illustrating such a method for a base station to provide synchronization signals, including signaling the synchronization signal block indices for those synchronization signals, to a wireless device in a cellular communication system, and for the wireless device to determine and report back a synchronization signal block index of a detected synchronization signal block, according to some embodiments.

Aspects of the method of FIG. 5 may be implemented by a wireless device and a cellular base station, such as a UE 106 and a BS 102 illustrated in and described with respect to various of the Figures herein, or more generally in conjunction with any of the computer systems or devices shown in the above Figures, among other devices, as desired. Note that while at least some elements of the method of FIG. 5 are described in a manner relating to the use of communication techniques and/or features associated with NR and/or 3GPP specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

According to some embodiments, some or all synchronization signal (SS) transmission parameters may be predetermined (e.g., specified in standards documents for a given cellular communication technology, fixed in advance by a network operator and/or infrastructure vendor in agreement with wireless device designers, manufacturers, and/or vendors, or otherwise predetermined), possibly with some characteristics depending on a frequency band in which a cell is deployed. For example, according to some embodiments, certain nominal SS configuration parameters, such as a SS burst set periodicity for the SS, may be predetermined. As one possibility, the SS burst set periodicity may correspond to the radio frame length used by a cell. According to some embodiments, each SS burst set may include one or more nominal SS bursts (which may also be referred to as SS groups), each of which in turn may further include one or more nominal SS blocks. Each SS block may include a primary synchronization signal, a secondary synchronization signal, and a physical broadcast channel. In some embodiments, the number of nominal SS blocks in each SS burst may be predetermined. The relative position (timing) of each nominal SS burst, and each nominal SS block within a SS burst, may also or alternatively be predetermined, according to some embodiments. Thus, with such a predetermined nominal SS configuration, each nominal SS block may have a predetermined location within the SS burst set. If the SS burst set periodicity corresponds to the radio frame length, determining which nominal SS block a wireless device detects may thus further allow the wireless device to determine the radio frame level timing of the cell. Alternatively, it may also be possible for some or all such transmission parameters to be dynamically selected by a cellular base station providing a cell.

Within such a framework, the BS 102 may have some control of at least some SS transmission parameters. Accordingly, in 502, the BS 102 may determine one or more SS transmission parameters. As one possibility, this may include determining which nominal SS blocks of each SS burst set will be transmitted by the BS 102. Although the configuration of nominal SS blocks and SS bursts within each SS burst set may be predetermined, it may be the case that a BS can select which of those nominal SS blocks (and potentially entire SS bursts) are actually transmitted by the BS. For example, in some instances, a BS might choose not to transmit SS blocks that would occur during uplink portions of one or more slots, or may choose not to transmit one or more entire SS bursts if the BS determines that good cell coverage can be provided without transmitting those SS bursts.

As another possibility, determining the one or more SS transmission parameters may include determining whether and how to beamform each SS block that will be transmitted by the BS 102. The BS 102 may schedule the same beam for different SS blocks, and/or may schedule different beams for different SS blocks, according to any desired arrangement. The arrangement may depend on any of various possible considerations, such as (e.g., propagation characteristics of) a frequency band on which the BS 102 is operating, a number of wireless devices currently served by the BS 102 (e.g., how loaded the BS is), configuration preferences of a network operator of the BS 102, physical terrain in the vicinity of the BS 102, etc.

Note that such transmission parameters selected by the BS 102 may be transparent to the wireless devices (e.g., including UE 106) that may detect synchronization signals provided by the BS 102. In other words, there may be no need to indicate to wireless devices which nominal SS blocks are or are not actually transmitted, or to indicate how SS blocks are beamformed by the BS 102, at least according to some embodiments.

In 504, the BS 102 may transmit the synchronization signals. The synchronization signals may be transmitted according to the predetermined transmission parameters and the transmission parameters selected by the BS 102. Thus, the synchronization signals may be transmitted according to a periodic pattern, such that in each period (e.g., each SS burst set), one or more SS bursts each including one or more SS blocks are transmitted. According to some embodiments, at least a portion of the SS blocks within each SS burst may be identical in content, e.g., such that they may be coherently combined for a combining gain to improve the likelihood of successful detection and decoding of the SS blocks. Each SS block may include an explicit indication (e.g., in the PBCH) of the nominal SS burst in which the SS block is included. Since the SS blocks within each SS burst may be identical in content, since the BS may choose not to transmit all nominal SS blocks, and/or since a wireless device may not necessarily be able to detect every SS block (e.g., due to different beam directions or for any of various other reasons), an implicit signaling technique may be used to indicate the relative position of each SS block within a SS burst. For example, a predetermined pattern of cyclic shifts may be used for each SS burst, such that the PBCH for each different SS block within the SS burst is shifted by a different number of cyclic shifts. As another possibility, a predetermined pattern of scrambling codes (or portions of a longer scrambling code) may be used for each SS burst, such that the PBCH for each different SS block within the SS burst is scrambled using a different scrambling code. In such cases, a wireless device may be able to determine the relative position of a detected SS block within a SS burst by testing various possible relative position hypotheses (e.g., a number of hypotheses equal to the number of nominal SS blocks in each SS burst) in accordance with the predetermined pattern of cyclic shifts or scrambling codes.

In 506, the UE 106 may detect a SS block transmitted by the BS 102. According to some embodiments, the PSS and/or SSS portions of the SS block may be detected by the UE 106, e.g., based on the cyclic and/or correlation properties of sequences used for those portions. According to some embodiments, the SS may be transmitted by the BS 102 and received by the UE 106 on a specific portion of the system bandwidth used by the BS 102, such as a specific central portion of the system bandwidth.

In 508, the UE 106 may determine a SS block index of the detected SS. The SS block index may identify which nominal SS block has been detected by the UE 106, and thus the location/timing of the detected SS block within the SS burst set, since, as previously noted, the location/timing of each nominal SS block in a given SS burst set may be predetermined.

Determining the SS block index may be a multi-part process, according to some embodiments. One part may include determining the relative location/timing of the detected SS block within its SS burst. This may include testing multiple hypotheses, e.g., based on the implicit signaling scheme used for indicating the relative location/timing of SS blocks within each SS burst, to determine which hypothesis (and thus relative position) is true. For example, if a cyclic shift based implicit signaling scheme is used, the UE 106 may attempt to decode the PBCH portion of the detected SS block using each of the possible numbers of cyclic shifts, and may determine the relative location of the detected SS block based on which number of cyclic shifts results in successful decoding of the PBCH. Similarly, if a scrambling code based implicit signaling scheme is used, the UE 106 may attempt to decode the PBCH portion of the detected SS block using each possible descrambling code, and may determine the relative location of the detected SS block based on which descrambling code results in successful decoding of the PBCH. Note that if desired (e.g., if there are multiple SS blocks with identical content in each SS burst), the UE 106 may combine the PBCH portions of multiple SS blocks when testing the decoding hypotheses, e.g., using the appropriate respective cyclic shift/scrambling code/etc. for each respective PBCH portion according to the decoding hypothesis. According to some embodiments, the number of decoding attempts may be equal to the number of SS blocks in each SS burst, e.g., such that one hypothesis may be tested for each possible relative position of the SS block within the SS burst.

Another part may include determining a SS burst index of the SS block. The SS burst index may be explicitly indicated in the PBCH for every SS block in a given SS burst (e.g., since each SS block in a given SS burst may have identical contents), at least according to some embodiments. Thus, once the PBCH has been successfully decoded, the UE 106 may be able to determine the SS burst index of the SS block. The combination of the SS burst index and the relative position of the detected SS block within the SS burst may thus effectively provide the SS block index for the detected SS block, which may uniquely identify the position/timing of the detected SS block within the SS burst set.

In 510, the UE 106 may provide an indication of the SS block index of the detected SS block to the BS 102. As previously noted, this may be informative to the BS 102 with respect to the beam arrangement that the UE 106 was able to detect and successfully decode, e.g., if different SS blocks are transmitted using different beam arrangements, and/or may otherwise provide useful information to the BS 102 based on the SS transmission characteristics selected by the BS 102. For example, the BS 102 may select a beam arrangement for one or more subsequent transmissions to the UE 106 based at least in part on the indication of the SS block index of the SS block detected by the UE 106, according to some embodiments.

Thus, it may be possible to provide a multi-part signaling scheme for indicating the SS block indices of SS blocks transmitted by a base station. Such a scheme may flexibly allow for different levels of decoding complexity vs. potential combining gain, at least according to some embodiments. For example, if a larger number of SS blocks are included in each SS burst, this may increase the potential combining gain when decoding, but at the cost of increased decoding complexity (e.g., as a greater number of hypotheses may need to be tested). In contrast, if a smaller number of SS blocks are included in each SS burst, this may limit the potential combining gain when decoding, but may also reduce the decoding complexity (e.g., as a smaller number of hypotheses may need to be tested). Further, while in many instances each burst set may include multiple SS bursts, and each SS burst may include multiple SS blocks, special cases in which only one SS burst is used per SS burst set, or in which each SS burst includes only one SS block, may also be possible. For example, an arrangement could be selected in which each burst set includes one nominal SS burst, which may include all of the SS blocks of the SS burst set. As another possibility, an arrangement could be selected in which each burst set includes multiple nominal SS bursts but each nominal SS burst includes a single nominal SS block.

FIGS. 6-10—Exemplary Synchronization Signal Block Organization and Configuration FIGS. 6-10 and the following information are provided as being illustrative of further considerations and possible implementation details relating to the method of FIG. 5, and are not intended to be limiting to the disclosure as a whole. Numerous variations and alternatives to the details provided herein below are possible and should be considered within the scope of the disclosure.

Figure 6:
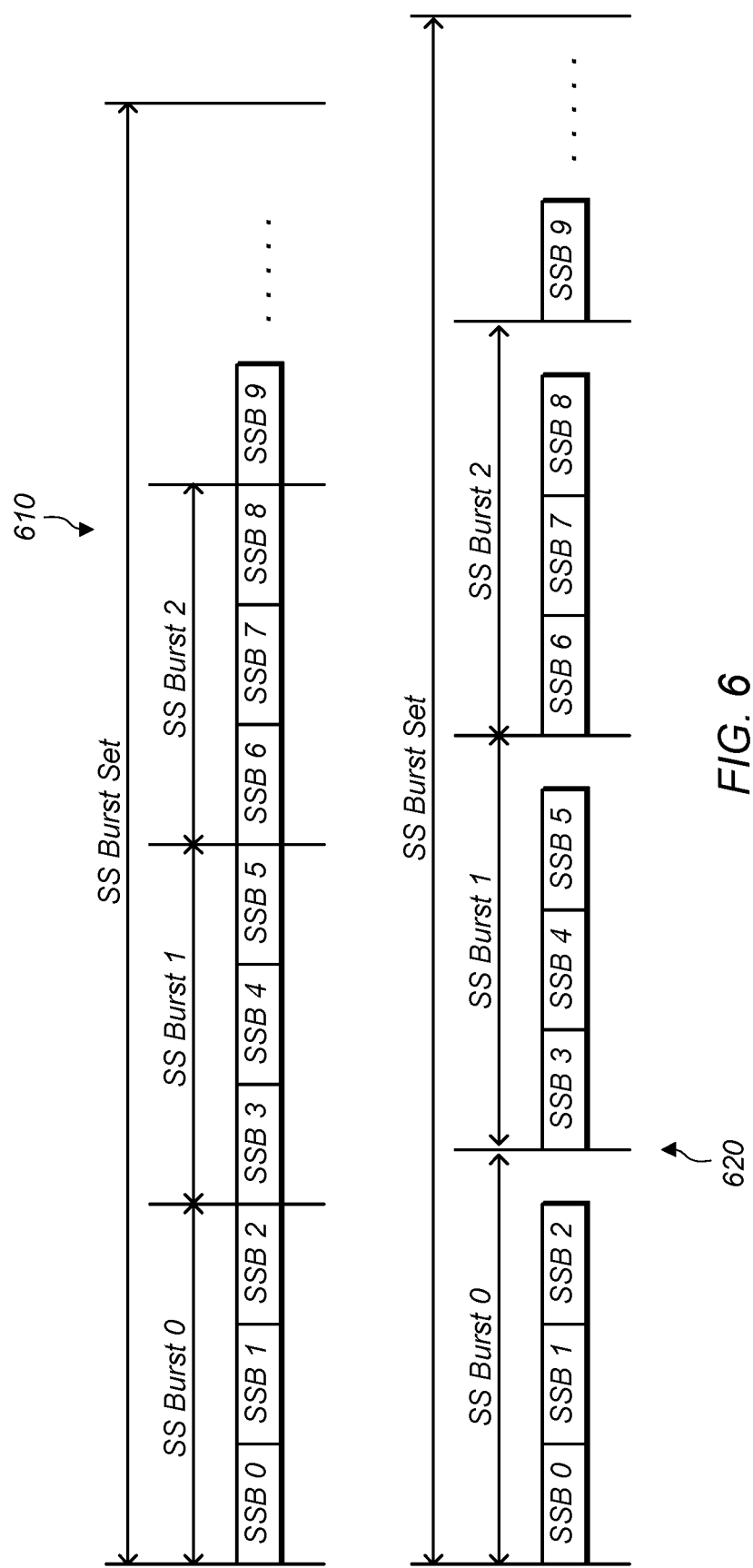
FIG. 6 illustrates two exemplary possible synchronization signal block organization schemes, according to some embodiments.

FIG. 6 illustrates two exemplary possible synchronization signal block organization schemes, according to some embodiments. As shown, each of the illustrated arrangements is organized as a SS burst set, which includes several SS bursts, each of which in turn includes several SS blocks. Each SS block may include a primary synchronization signal, a secondary synchronization signal, and a physical broadcast channel. In the first illustrated arrangement 610, SS blocks are consecutive (e.g., temporally contiguous) across SS burst boundaries, while in the second illustrated arrangement 620, SS blocks are non-consecutive (e.g., not temporally contiguous) across SS burst boundaries. Note that while it may be possible to use either of the illustrated arrangements, among various additional possibilities, at least according to some embodiments it may be beneficial for the selected arrangement to be predetermined (e.g., specified in standards documents or otherwise pre-agreed upon), e.g., to support the ability of a wireless device to uniquely identify the location within a burst set of a given SS block based on its SS block index.

The various portions of each SS block may be used for various synchronization purposes. According to some embodiments, the PSS may provide symbol level timing, and indicate the boundary of a SS block. The SSS may indicate the cell ID for a cell. The PBCH may provide the SS burst and/or block index, radio frame level timing, system bandwidth, and the system frame number. Note that each SS burst set may have a fixed periodicity value (e.g., 20 ms, as one possibility), which may correspond to or otherwise be correlated with the radio frame length used by a cell, which may facilitate determination of the radio frame level timing by a wireless device that receives a SS block using the PBCH portion of the SS block.

Note that while the example schemes illustrated in FIG. 6 show an arrangement in which at least 3 nominal SS bursts are included in each SS burst set, and 3 nominal SS blocks are included in each SS burst, this is for illustrative purposes only, and any of various numbers are also or alternatively possible for each such parameter. As a generalization, it may be the case that each SS burst set contains M SS bursts, where 1<=M<=N, each SS burst contains K SS blocks, where 1<=K<=N, and the total number of SS blocks per SS burst set is N=K*M. It may be the case that the value of K can be band dependent, but may be predetermined (e.g., specified by standards). The values of M and N may or may not be predetermined (e.g., may be configured by the network (e.g., by the base station) and/or specified by standards).

Note that in each illustrated arrangement, and more generally if desired, the timing offset of each SS block relative to the beginning of the SS burst set may be predetermined. For example, the timing offset of each SS burst relative to the SS burst set may be predetermined, and the timing offset of each SS block within a SS burst may be predetermined.

Figure 7:
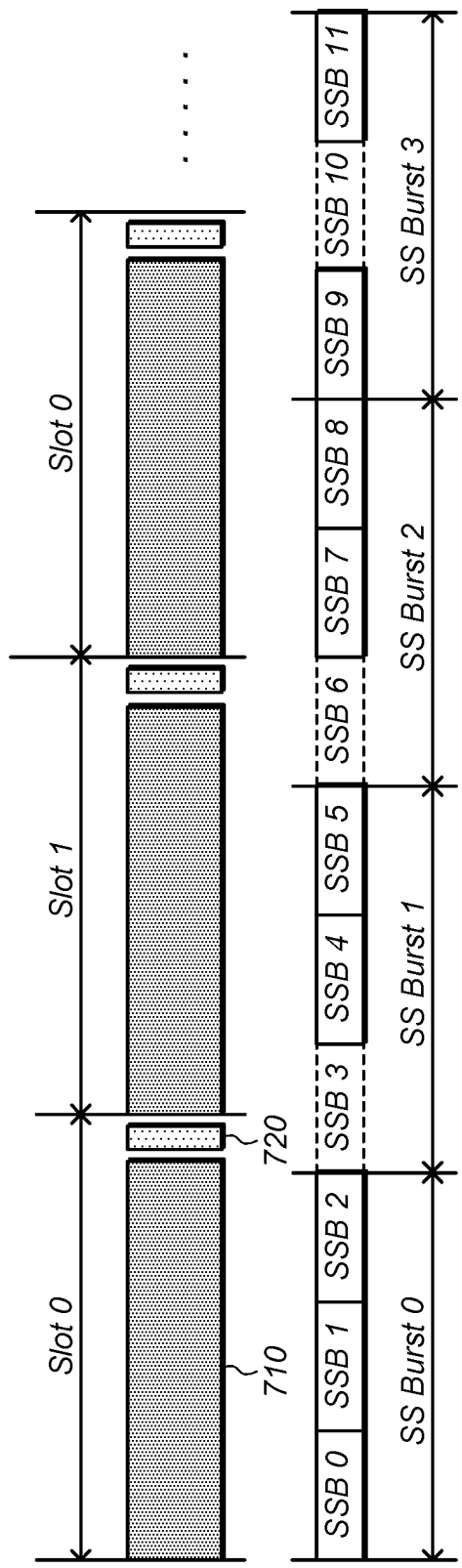
FIG. 7 illustrates an exemplary possible network selected set of synchronization signal blocks to transmit, according to some embodiments.

FIG. 7 illustrates an exemplary possible network selected set of synchronization signal blocks to transmit, according to some embodiments. At least some cellular communication technologies (e.g., NR) may support a flexible slot structure, e.g., in which multiple downlink slots could be aggregated before an uplink opportunity, mini slots may be possible, symbols may be provided for both uplink and downlink in the same subframe, etc. Additionally, the slot structure and numerology for data communication may be different from the SS numerology, at least in some instances.

According to some embodiments, it may be possible that a base station may not select every nominal SS block to be transmitted. This may allow the base station to selectively avoid transmitting SS blocks (and/or entire SS bursts) for any of a variety of reasons, e.g., in keeping with the flexible slot structure.

In the illustrated scheme, an arrangement in which SS blocks are consecutive across SS burst boundaries is used. A slot structure in which each illustrated slot includes a downlink portion (e.g., downlink portion 710) and an uplink portion (e.g., uplink portion 720) may also be used. As shown, certain of the nominal SS blocks (e.g., SSBs 3, 6, and 10) may overlap with uplink portions. In this example, a base station might choose not to transmit synchronization signals during these nominal SS blocks, e.g., to avoid the uplink occasions.

Such selective transmission of SS blocks may be transparent to wireless devices served by the base station. In some instances, one or more other configuration parameters may also or alternatively be selected by the base station in a manner transparent to wireless devices served by the base station. For example, a base station may schedule the same beam for different SS blocks, e.g., for coverage extension or to enable receiver beam sweeping, or may schedule different beam arrangements for different SS blocks, as desired.

Figure 8:
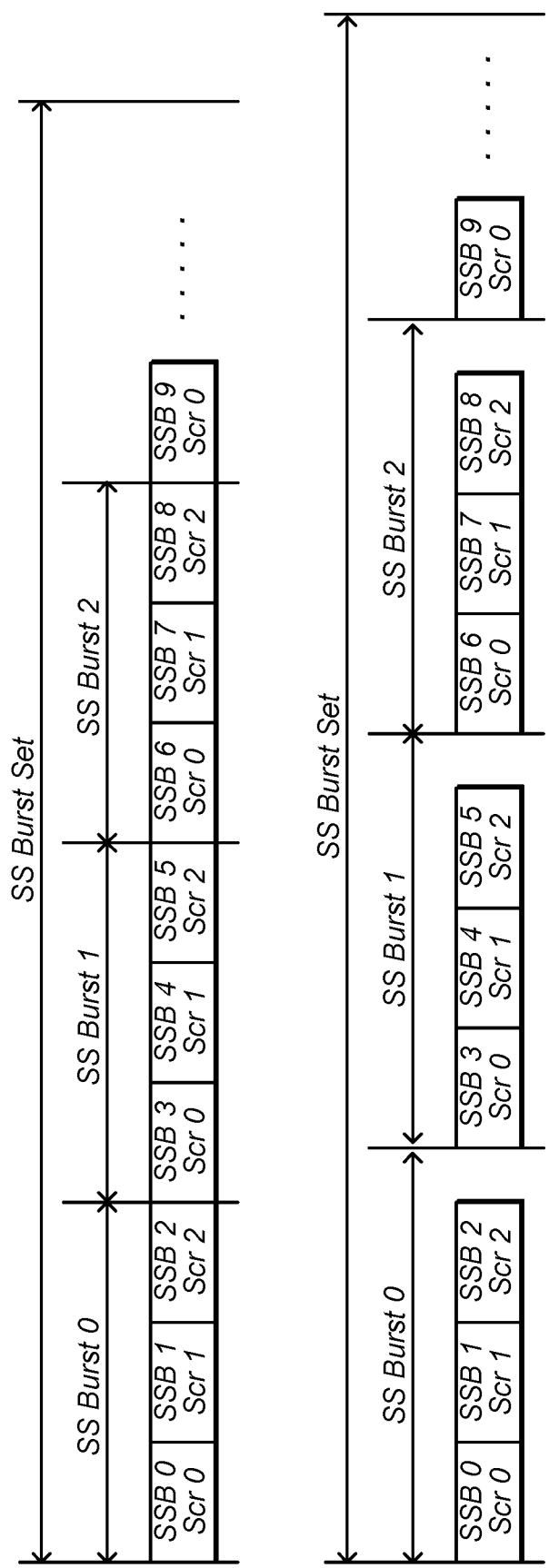
FIG. 8 illustrates an exemplary possible synchronization signal block index signaling scheme using scrambling codes, according to some embodiments.

FIG. 8 illustrates an exemplary possible synchronization signal block index signaling scheme using scrambling codes, according to some embodiments. As shown, the scheme may be used for SS burst sets in which SS blocks are consecutive across SS burst boundaries, and/or for SS burst sets in which SS blocks are non-consecutive across SS burst boundaries. In some instances, as illustrated, SS blocks within each SS burst may be temporally contiguous. Alternatively, though not illustrated in FIG. 8, it may also be possible for some or all of the SS blocks within each SS burst to be temporally non-contiguous.

The SS block index signaling scheme may include multiple levels of signaling. One signaling level may include indication of the SS burst index of a SS block. This may be indicated using information bits included in the PBCH of an SS block. As previously noted, it may be the case that PBCH contents may be the same for SS blocks within a SS burst, such that coherent combining of up to the K SS blocks within a SS burst may be possible.

A second signaling level may include indication of the position of the SS block within a SS burst, which may be provided using PBCH scrambling codes in the illustrated scheme. In this case, K different scrambling codes may be used per cell, such that each of the K SS blocks in a SS burst are scrambled using a different scrambling code. Thus, SSB 0 of SS burst 0 may be scrambled using scrambling code Scr 0, SSB 1 of SS burst 0 may be scrambled using scrambling code Scr 1, and SSB 2 of SS burst 0 may be scrambled using scrambling code Scr 2. The same scrambling codes may be reused for different SS bursts, e.g., such that SSB 3 of SS burst 1 may be scrambled using scrambling code Scr 0, SSB 4 of SS burst 1 may be scrambled using scrambling code Scr 1, and SSB 5 of SS burst 1 may be scrambled using scrambling code Scr 2, as illustrated, and so on, if desired.

Note that the scrambling codes can be different pseudo noise (PN) sequences, or different shifts (segments) of a long PN sequence, among various possibilities. The PN sequences can be selected from a class of existing sequences (e.g., with good correlation properties), such as M-sequences, Gold sequences, Kasami sequences, etc.

Figure 9:
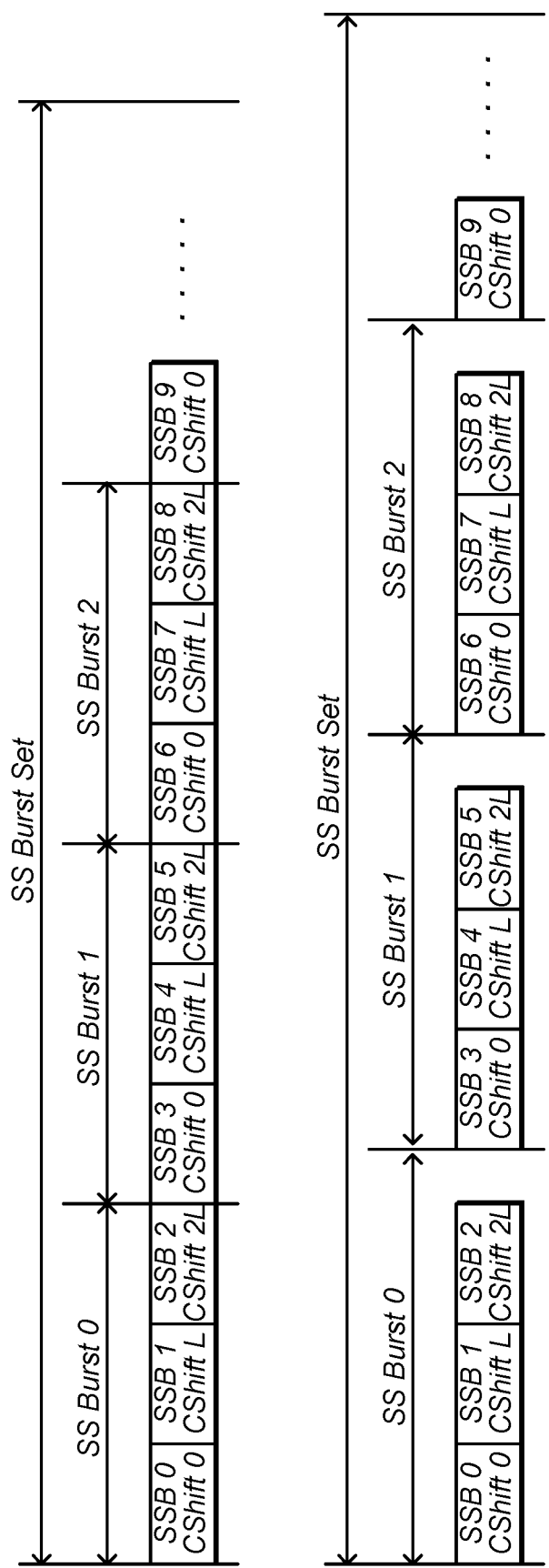
FIG. 9 illustrates an exemplary possible synchronization signal block index signaling scheme using cyclic shifts, according to some embodiments.

FIG. 9 illustrates an exemplary possible synchronization signal block index signaling scheme using cyclic shifts, according to some embodiments. Similar to the scheme of FIG. 8, the scheme may be used for SS burst sets in which SS blocks are consecutive across SS burst boundaries, and/or for SS burst sets in which SS blocks are non-consecutive across SS burst boundaries. In some instances, as illustrated, SS blocks within each SS burst may be temporally contiguous. Alternatively, though not illustrated in FIG. 9, it may also be possible for some or all of the SS blocks within each SS burst to be temporally non-contiguous.

Also similar to the scheme of FIG. 8, the SS block index signaling scheme may include multiple levels of signaling. One signaling level may include indication of the SS burst index of a SS block. This may be indicated using information bits included in the PBCH of an SS block. As previously noted, it may be the case that PBCH contents may be the same for SS blocks within a SS burst, such that coherent combining of up to the K SS blocks within a SS burst may be possible.

A second signaling level may include indication of the position of the SS block within a SS burst, which may be provided using cyclic shifts in the illustrated scheme. In this case, K different cyclic shifts may be used per cell, such that each of the K SS blocks in a SS burst are shifted using a different number of cyclic shifts. Thus, SSB 0 of SS burst 0 may be shifted by 0 (may not be shifted), SSB 1 of SS burst 0 may be shifted by L, and SSB 2 of SS burst 0 may be shifted by 2L. The cyclic shifting pattern may be reused for different SS bursts, e.g., such that SSB 3 of SS burst 1 may be shifted by 0, SSB 4 of SS burst 1 may be shifted by L, and SSB 5 of SS burst 1 may be shifted by 2L, as illustrated, and so on, if desired.

Figure 10:
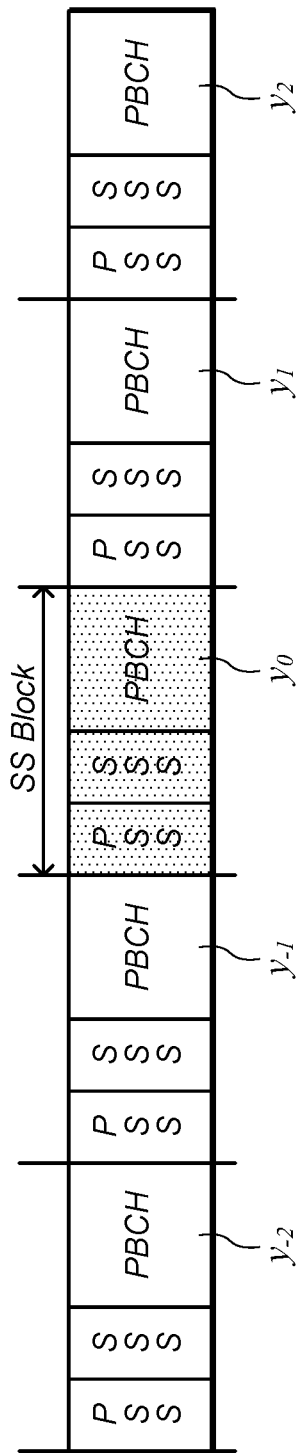
FIG. 10 illustrates an exemplary possible synchronization signal block detected by a wireless device, along with previous and subsequent synchronization signal blocks, according to some embodiments.

FIG. 10 illustrates an exemplary possible synchronization signal block detected by a wireless device, along with previous and subsequent synchronization signal blocks, according to some embodiments. In the illustrated example scenario, each synchronization signal block may include a PSS portion, followed by a SSS portion, and by a PBCH portion, in a temporally contiguous manner. However, it should be noted that such an arrangement is provided as a non-limiting example, and any number of other synchronization signal block arrangements (e.g., in which different portions are included, in which the portions are arranged in a different order, in which one or more temporal gaps are inserted between portions, etc.) are also possible.

Consider that a wireless device may have detected the SS block including the PBCH denoted as $y_0$ in a system with K=3, as an example. In this case, the wireless device may perform K PBCH decoding attempts to successfully decode the PBCH. The decoding attempts may correspond to the possible relative positioning hypotheses for the detected SS block within its SS burst. Since K=3 in this example, the possibilities include $y_0$ being the first SS block in a SS burst also including $y_1$ and $y_2$, $y_0$ being the second SS block in a SS burst also including $y_{-1}$ and $y_1$, or $y_0$ being the third SS block in a SS burst also including $y_{-2}$ and $y_{-1}$.

For a scenario in which scrambling codes are used, the scrambling codes may be denoted as $s_0$, $s_1$, and $s_2$. Thus, it may be possible for a receiver to test 3 hypotheses on the SS block index corresponding to the detected PSS/SSS block, including obtaining the combining gain from the other SS blocks in the same SS burst, using the following equations:

$$y_{comb}^0 = y_0 \cdot s_0^* + y_1 \cdot s_1^* + y_2 \cdot s_2^*$$

$$y_{comb}^1 = y_{-1} \cdot s_0^* + y_0 \cdot s_1^* + y_1 \cdot s_2^*$$

$$y_{comb}^2 = y_{-2} \cdot s_0^* + y_{-1} \cdot s_1^* + y_0 \cdot s_2^*$$

where the "•" operator denotes element-wise multiplication between 2 vectors.

For a scenario in which cyclic shifts are used, a cyclic shift of a vector y by L elements may be denoted by $y^{(L)}$. In such a scenario, it may be possible for a receiver to test 3 hypotheses on the SS block index corresponding to the detected PSS/SSS block, including obtaining the combining gain from the other SS blocks in the same SS burst, using the following equations:

$$y_{comb}^0 = y_0^{(0)} + y_1^{(-L)} + y_2^{(-2L)}$$

$$y_{comb}^1 = y_{-1}^{(0)} + y_0^{(-L)} + y_{-1}^{(-2L)}$$

$$y_{comb}^2 = y_{-2}^{(0)} + y_{-1}^{(-L)} + y_0^{(-2L)}$$

For the general case with K SS blocks per SS burst, a receiver may make K PBCH decoding attempts. Different values of (K, M) may thus lead to different trade-offs of complexity and combining gain, including the following special cases. K=1, M=N may be a special case in which all information needed to determine the SS block index is included within the PBCH information bits, such that it may not be necessary to test multiple PBCH hypotheses. K=N, M=1 may be a special case in which the PBCH of all SS blocks in a SS burst set have identical content but are implicitly differentiated (e.g., by scrambling codes or cyclic shifts), such that the maximum number of PBCH hypothesis tests may be needed, but the most combining gain may be obtained.

As previously noted, the beam direction mapping to SS blocks by a base station may be transparent to wireless devices served by the base station. This may allow the base station to decide to transmit different SS blocks using different beam directions (e.g., for fast TX beam sweeping), and/or to transmit different SS blocks using the same beam direction (e.g., for better coverage or to enable RX beam sweeping). It may be sufficient for the wireless device to know the value of K (e.g., which may be defined in specification documents, possibly in a band dependent manner), and potentially the timing offset of each nominal SS burst within a burst set (e.g., if SS blocks are not consecutive across SS burst boundaries).

It should also be noted that the exemplary time division multiplexed SS block format for an SS block shown in FIG. 10 is provided for illustrative purposes only, and that other SS block formats are also possible. For example, while the illustrated format includes 4 symbols, of which a first symbols includes the PSS, the second symbol includes the SSS, and the third and fourth symbols include the PBCH, a different number of symbols may be used, the PSS, SSS, and PBCH may be multiplexed in a different order, and/or the PBCH may be provided using consecutive symbols (e.g., as shown) or non-consecutive symbols (e.g., 1 before PSS, 1 after SSS, such that the 4 symbols in the SS block may include a PBCH part 1, PSS, SSS, and PBCH part 2), among various possibilities.

In the following further exemplary embodiments are provided.

One set of embodiments may include a method, comprising: by a cellular base station: transmitting a plurality of synchronization signal (SS) blocks according to a periodic pattern, wherein, in each period of the periodic pattern, one or more SS bursts each comprising one or more SS blocks are transmitted, wherein each SS block has a SS block index that identifies its location within the period; and receiving an indication of a SS block index of a SS block detected by a wireless device for each of one or more wireless devices within a communication range of the cellular base station.

Another set of embodiments may include a method, comprising: by a wireless device: detecting a synchronization signal (SS) block from a cellular base station; determining a SS block index of the SS block that identifies the location of the SS block within a period of a periodic pattern according to which the SS are transmitted by the cellular base station; and transmitting an indication of the SS block index of the SS block detected by the wireless device to the cellular base station.

According to some embodiments, in each period of the periodic pattern, one or more SS bursts each comprising one or more SS blocks are transmitted, wherein determining a SS block index of the SS block comprises determining a SS burst index of a SS burst comprising the detected SS block and determining a relative position of the detected SS block within the SS burst.

According to some embodiments, determining the relative position of the detected SS block within the SS burst comprises performing a number of decoding attempts equal to a number of SS blocks in the SS burst to test each possible relative location hypothesis.

According to some embodiments, the method further comprises, by the wireless device: performing coherent combining of a physical broadcast channel portion of the detected SS block and a physical broadcast channel portion of at least one additional SS block in a same SS burst as the detected SS block.

According to some embodiments, the SS block index for each SS block is indicated using a two part signaling arrangement, wherein one part comprises a relative location of the SS block within a SS burst, wherein another part comprises a SS burst index value explicitly indicated in each of the one or more SS blocks of each SS burst.

According to some embodiments, the relative location of each SS block within a SS burst is implicitly signaled using a predetermined pattern of cyclic shifts configured for the SS blocks of the SS burst.

According to some embodiments, the relative location of each SS block within a SS burst is implicitly signaled using a predetermined pattern of scrambling codes configured for the SS blocks of the SS burst.

According to some embodiments, in each period of the periodic pattern, a plurality of SS bursts each comprising a plurality of SS blocks are transmitted, wherein each SS block comprises a primary synchronization signal portion, a secondary synchronization signal portion, and a physical broadcast channel portion, wherein each SS block in a SS burst has identical content in at least the physical broadcast channel portion.

Another exemplary embodiment may include a wireless device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A wireless device, comprising:
an antenna;
a radio operably coupled to the antenna; and
a processor operably coupled to the radio, wherein the processor is configured to cause the wireless device to:
detect a synchronization signal (SS) block from a cellular base station;
determine a scrambling code for the physical broadcast channel portion of the detected SS block by testing a plurality of relative position hypotheses for the detected SS block, wherein each test uses a different scrambling code, and wherein relative positions of SS blocks are implicitly signaled using scrambling codes for the physical broadcast channel portion of the detected SS block;
determine a relative position of the detected SS block based on the scrambling code;
determine a SS block index of the detected SS block based on the relative position of the detected SS block; and
transmit an indication of the SS block index of the detected SS block to the cellular base station.

2. The wireless device of claim 1,
wherein the SS are transmitted by the cellular base station according to a periodic pattern,
wherein, in each period of the periodic pattern, a plurality of SS bursts each comprising a plurality of SS blocks are transmitted, wherein each SS block comprises a primary synchronization signal portion, a secondary synchronization signal portion, and a physical broadcast channel portion.

3. The wireless device of claim 2, wherein each SS block in a SS burst has identical content but is implicitly differentiated by scrambling codes in at least the physical broadcast channel portion.

4. The wireless device of claim 1, wherein the processor is further configured to cause the wireless device to:
   determine radio frame level timing of a cell provided by the cellular base station based at least in part on the SS block index of the detected SS block.

5. The wireless device of claim 1, wherein one or more SS bursts each comprising one or more SS blocks are transmitted in each period of a periodic pattern.

6. The wireless device of claim 1, wherein the processor is further configured to cause the wireless device to:
   perform coherent combining of a physical broadcast channel portion of the detected SS block and a physical broadcast channel portion of at least one additional SS block in a same SS burst as the detected SS block.

7. The wireless device of claim 1, wherein the SS block index for each SS block is indicated using a two part signaling arrangement, wherein one part comprises a relative location of the SS block within a SS burst, wherein another part comprises a SS burst index value explicitly indicated in the physical broadcast channel, and wherein determining the SS block index is based on the SS burst index value.

8. An apparatus, comprising:
   a processor, configured to cause a wireless device to:
      detect a synchronization signal (SS) block from a cellular base station;
      determine a scrambling code for the physical broadcast channel portion of the detected SS block by testing a plurality of relative position hypotheses for the detected SS block, wherein each test uses a different scrambling code, and wherein relative positions of SS blocks are implicitly signaled using scrambling codes for the physical broadcast channel portion of the detected SS block;
      determine a relative position of the detected SS block based on the scrambling code;
      determine a SS block index of the detected SS block based on the relative position of the detected SS block; and
      transmit an indication of the SS block index of the detected SS block to the cellular base station.

9. The apparatus of claim 8,
   wherein the SS are transmitted by the cellular base station according to a periodic pattern,
   wherein, in each period of the periodic pattern, a plurality of SS bursts each comprising a plurality of SS blocks are transmitted, wherein each SS block comprises a primary synchronization signal portion, a secondary synchronization signal portion, and a physical broadcast channel portion.

10. The apparatus of claim 9, wherein each SS block in a SS burst has identical content but is implicitly differentiated by scrambling codes in at least the physical broadcast channel portion.

11. The apparatus of claim 8, wherein the processor is further configured to cause the wireless device to:
   determine radio frame level timing of a cell provided by the cellular base station based at least in part on the SS block index of the detected SS block.

12. The apparatus of claim 8, wherein one or more SS bursts each comprising one or more SS blocks are transmitted in each period of a periodic pattern.

13. The apparatus of claim 8, wherein the processor is further configured to cause the wireless device to:
   perform coherent combining of a physical broadcast channel portion of the detected SS block and a physical broadcast channel portion of at least one additional SS block in a same SS burst as the detected SS block.

14. The apparatus of claim 8, wherein the SS block index for each SS block is indicated using a two part signaling arrangement, wherein one part comprises a relative location of the SS block within a SS burst, wherein another part comprises a SS burst index value explicitly indicated in the physical broadcast channel, and wherein determining the SS block index is based on the SS burst index value.

15. A method, comprising:
   by a wireless device:
   detecting a synchronization signal (SS) block from a cellular base station;
   determining a scrambling code for the physical broadcast channel portion of the detected SS block by testing a plurality of relative position hypotheses for the detected SS block, wherein each test uses a different scrambling code, and wherein relative positions of SS blocks are implicitly signaled using scrambling codes for the physical broadcast channel portion of the detected SS block;
   determining a relative position of the detected SS block based on the scrambling code;
   determining a SS block index of the detected SS block based on the relative position of the detected SS block; and
   transmitting an indication of the SS block index of the detected SS block to the cellular base station.

16. The method of claim 15,
   wherein the SS are transmitted by the cellular base station according to a periodic pattern,
   wherein, in each period of the periodic pattern, a plurality of SS bursts each comprising a plurality of SS blocks are transmitted, wherein each SS block comprises a primary synchronization signal portion, a secondary synchronization signal portion, and a physical broadcast channel portion.

17. The method of claim 16, wherein each SS block in a SS burst has identical content but is implicitly differentiated by scrambling codes in at least the physical broadcast channel portion.

18. The method of claim 15, further comprising:
   determining radio frame level timing of a cell provided by the cellular base station based at least in part on the SS block index of the detected SS block.

19. The method of claim 15, wherein one or more SS bursts each comprising one or more SS blocks are transmitted in each period of a periodic pattern.

20. The method of claim 15, further comprising:
   performing coherent combining of a physical broadcast channel portion of the detected SS block and a physical broadcast channel portion of at least one additional SS block in a same SS burst as the detected SS block.

* * * * *